(12) United States Patent
Case et al.

(10) Patent No.: US 12,444,100 B2
(45) Date of Patent: Oct. 14, 2025

(54) SELF-DETERMINED SHOT GEOMETRY FOR OPEN-CONFIGURATION PORTABLE X-RAY COMPUTED TOMOGRAPHY (CT)

(71) Applicant: The Aerospace Corporation, El Segundo, CA (US)

(72) Inventors: Joseph T. Case, Hawthorne, CA (US); Shant Kenderian, Pasadena, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 466 days.

(21) Appl. No.: 18/051,052

(22) Filed: Oct. 31, 2022

(65) Prior Publication Data

US 2024/0020890 A1 Jan. 18, 2024

Related U.S. Application Data

(63) Continuation-in-part of application No. 17/863,490, filed on Jul. 13, 2022, now Pat. No. 12,327,378.

(51) Int. Cl.
*G06K 9/00* (2022.01)
*G06T 7/73* (2017.01)
*G06T 11/00* (2006.01)

(52) U.S. Cl.
CPC ............. *G06T 11/008* (2013.01); *G06T 7/73* (2017.01); *G06T 11/005* (2013.01); *G06T 2207/10081* (2013.01); *G06T 2207/10116* (2013.01); *G06T 2211/40* (2013.01)

(58) Field of Classification Search
CPC .............. G06T 11/006; G06T 7/80; G06T 2207/10081
See application file for complete search history.

(56) References Cited

U.S. PATENT DOCUMENTS

| | | | |
|---|---|---|---|
| 10,096,148 B1 | 10/2018 | Case et al. | |
| 2016/0278724 A1* | 9/2016 | Papaioannou | A61B 6/102 |
| 2017/0164919 A1* | 6/2017 | Lavallee | A61B 6/4405 |
| 2019/0175131 A1* | 6/2019 | Duewer | A61B 6/025 |
| 2020/0078938 A1* | 3/2020 | Bradski | B25J 9/1697 |
| 2022/0042930 A1* | 2/2022 | Stiebeiner | G01N 23/046 |

OTHER PUBLICATIONS

Albiol, et al., "Geometrical Calibration of X-Ray Imaging with RGB Cameras for 3D Reconstruction", IEEE Transactions on Medical Imaging, vol. 35, No. 8, Aug. 2016.
Cheriet, et al., "Self-calibration of a biplane X-ray imaging system for an optimal three dimensional reconstruction", Computerized Medical Imaging and Graphics 23 (1999) 133-141.

(Continued)

*Primary Examiner* — Gregory A Morse
*Assistant Examiner* — Owais Iqbal Memon
(74) *Attorney, Agent, or Firm* — LeonardPatel PC (57) ABSTRACT

Self-determined shot geometry for open-configuration portable x-ray computed tomography (CT) includes capturing one or more x-ray shot images into a computing system, and estimating an unknown constellation model and one or more shot geometries. It also includes reconstructing a volume image from the one or more captured shot images and the one or more geometries using computed tomography.

19 Claims, 9 Drawing Sheets

(56) References Cited

OTHER PUBLICATIONS

Cho, et al., "Accurate technique for complete geometric calibration of cone-beam computed tomography systems", Med. Phys. 32 (4), Apr. 2005.

Elble, et al., "GPU computing with Kaczmarz's and other iterative algorithms for linear systems", Parallel Comput. Jun. 1, 2010; 36(5-6): 215-231. doi:10.1016/j.parco.2009.12.003.

Ferrucci, et al., "Towards Geometrical Calibration of X-Ray Computed Tomography Systems—a Review", Meas. Sci. Technol. 26 (2015) 092003 (30pp).

Rougee, et al., "Geometrical Calibration for 3D X-Ray Imaging", Proceedings of SPIE, Medical Imaging 1993, 1993, Newport Beach, CA, United States.

Rougee, et al., "Geometrical Calibration of X-Ray Imaging Chains for Three-Dimensional Reconstruction", Computerized Medical Imaging and Graphics, vol. 17, Nos. 4/5, pp. 295-300, 1993.

Sato, et al., "Geometry Calibration between X-Ray Source and Detector for Tomosynthesis with a Portable X-Ray System", Int J Cars (2017) 12:707-717.

Schumann, et al, "X-Ray Image Calibration and its Application to Clinical Orthopedics", Medical Engineering & Physics 36 (2014) 968-974.

Sun, et al., "A Calibration Method for Misaligned Scanner Geometry in Cone-Beam Computed Tomography", NDT & E International, vol. 39, No. 6, pp. 499-513, Sep. 2006, doi: 10.1016/J.NDTEINT.2006.03.002.

Vollebregt, Edwin, "The Bound-Constrained Conjugate Gradient Method for Non-Negative Matrices", J. Optim Theory Appl (2014) 162:931-953.

Owais Iqbal MEMON, "Non-Final Office Action", issued Dec. 2, 2024, U.S. Appl. No. 17/863,490.

* cited by examiner

SELF-DETERMINED SHOT GEOMETRY FOR OPEN-CONFIGURATION PORTABLE X-RAY COMPUTED TOMOGRAPHY (CT)

CROSS REFERENCE TO RELATED APPLICATIONS

This application is a continuation-in-part of, and claims priority to and the benefit of, U.S. patent application Ser. No. 17/863,490, filed on Jul. 13, 2022. This application incorporates the subject matter of the earlier filed application.

FIELD

The present invention relates to a technique for the self-determination of shot geometry specifically intended for use in open-configuration portable x-ray CT.

BACKGROUND

Computed tomography (CT) is a process by which many x-ray shots are reconstructed into a volume image. To do this, the shot geometry for every x-ray shot must be known such that the x-ray source position, detector position, and detector orientation are all known.

In conventional CT, a rotation stage is calibrated so that these shot geometries are known. This process is called geometric calibration and it is well known for conventional x-ray CT and tomosynthesis systems. Conventional CT utilizes large known constellations of ball bearings or similar encased in rigid plastic structures, which is called a reference constellation. The Conventional CT then solves for the shot geometry given a rotational axis of symmetry and exploit mechanical repeatability such that the reference constellation may be removed from the scene for typical x-ray shots.

Unfortunately, none of the known geometric calibration techniques are suitable for portable x-ray CT such that the reference constellation must remain in the scene of interest for all x-ray shots, which are not mechanically repeatable.

To address these shortcomings, the earlier filed patent application was filed for self-determined shot geometry from a known reference constellation. The results of this were highly successful to produce a volume image; however, each fiducial in the constellation must be identified and tracked in every x-ray shot. This is difficult to perform in practice.

Thus, an alternative technique removing this requirement is needed.

SUMMARY

Certain embodiments of the present invention may provide solutions to the problems and needs in the art that have not yet been fully identified, appreciated, or solved by current open configuration portable x-ray CT technology. For example, some embodiments of the present invention pertain to a self-determined shot geometry for open-configuration portable x-ray CT using an unknown constellation.

In an embodiment, a method may include capturing one or more x-ray shot images into a computing system. The method includes estimating an unknown constellation model and one or more shot geometries, and includes reconstructing a volume image from the one or more captured shot images and the one or more geometries using computed tomography.

In another embodiment, a system includes a processor and memory comprising a set of instructions. The set of instructions is configured to cause the at least one processor to execute capturing one or more x-ray shot images into a computing system. The set of instructions is further configured to cause the at least one processor to execute estimating an unknown constellation model and one or more shot geometries, and reconstructing a volume image from the one or more captured shot images and the one or more geometries using computed tomography.

In yet another embodiment, a non-transitory computer-readable medium includes a computer program. The computer program is configured to cause at least one processor to execute capturing one or more x-ray shot images into a computing system. The computer program is further configured to cause the at least one processor to execute estimating an unknown constellation model and one or more shot geometries, and reconstructing a volume image from the one or more captured shot images and the one or more geometries using computed tomography.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Open-configuration portable x-ray computed tomography (CT) is a technology that enables the volumetric inspections of regions of interest on large parts, which have been impossible to this point. The open configuration aspect of x-ray CT allows it to be portable and applicable to large and irregular parts that are otherwise not conducive to conventional booth setups or ring geometry.

Additionally, open-configuration portable x-ray CT allows placing an x-ray source and a detector on opposite sides of a barrier (i.e., a ship hull or a wall) while inspecting for regions of interest with limited access. Although open-configuration portable x-ray CT is not a focus of some of these embodiments, the process of self-determining x-ray shot geometry for open-configuration portable x-ray CT using an unknown constellation of fiducials is of interest. The geometry is self-determined since the geometry of the shot is determined from the shot itself. Such an embodiment (s) is unique from a related U.S. patent application Ser. No. 17/863,490, filed on Jul. 13, 2022, entitled "Self-Determined Shot Geometry for Open-Configuration Portable X-Ray Computed Tomography (CT)" which used a known constellation as opposed to an unknown constellation.

In some embodiments, a customized geometric calculation technique is developed specifically for open-configuration portable x-ray CT using a flat panel digital detector, a cone beam x-ray source, and an unknown constellation of fiducials. These embodiments are different when compared to related U.S. patent application Ser. No. 17/863,490, filed on Jul. 13, 2022, (the "related application") that makes specific steps to reduce the complexity of use in practice. The process may be used for x-ray or gamma ray inspections.

In an embodiment, the reference constellation is unknown and includes a few fiducials (i.e., points) since the reference constellation must remain in the scene of interest for all x-ray shots. It should be noted that not all fiducials must be visible in every shot; thus, one may produce a volume image larger than the detector. For example, fiducials may be affixed to the structure under test by hand, where they remain stationary for the duration of the inspection.

In a further embodiment, one fiducial is identified as the origin of the coordinate system. Identification is assisted by the fiducial having a unique feature (i.e., size, texture, or shape). The one fiducial does not have to be visible in every shot. Identification may be performed manually or automatically. The other fiducials are located but they do not need to be identified. This feature is supported by algorithmic design as will be described later. Locating may be performed manually or automatically.

In yet some further embodiments, fiducials may be affixed onto the specimen under test manually or automatically before image acquisition. The fiducials can then be digitally removed from the volume image prior to volume image analysis.

Some embodiments generally pertain to a process for determining the reference constellation and the geometry of each x-ray shot, which enables open-configuration portable x-ray CT. The process accurately estimates the positions of all constellation fiducials, which is a unique feature.

The process also simultaneously estimates the source position and detector position and orientation for every shot taken. These critical parameters are referred to as the geometry, which are determined for every x-ray shot. The constellation represents the coordinate system, and the coordinate system cannot be removed since portable x-ray CT may not provide mechanical repeatability. These restrictions require modifications to ensure the proper determination of shot geometry.

A single identified fiducial and a single x-ray shot determine the coordinate system, which is also a unique feature. All other fiducials do not require identification, which is yet another unique feature. In fact, the fiducials may be placed by hand before inspection, which is another unique feature. These fiducials may be subsequently removed in the reconstructed volume image, which is a unique feature.

Shot Geometry Description

As described in parent and related application for portable x-ray CT, the x-ray shot geometry may be quantified by the source position (s) in Cartesian coordinates $$\bar{s} = (s_x, s_y, s_z), \quad (1)$$

the detector position (d) in Cartesian coordinates $$\bar{d} = (d_x, d_y, d_z), \quad (2)$$

and the orthogonal detector orientation unit vectors $$\bar{v}_0 = (v_{0x}, v_{0y}, v_{0z}) \quad (3)$$

$$\bar{v}_1 = (v_{1x}, v_{1y}, v_{1z}) \quad (4)$$

$$\bar{v}_2 = (v_{2x}, v_{2y}, v_{2z}) = \bar{v}_0 \times \bar{v}_1. \quad (5)$$

Nine unknowns may be used to describe this geometry ($\bar{g}$): the generator position ($\bar{s}$), the detector position ($\bar{d}$), and the rotation angles for roll, pitch, and yaw ($r_x, r_y, r_z$), which makes $$\bar{g} = (s_x, s_y, s_z, d_x, d_y, d_z, r_x, r_y, r_z). \quad (6)$$

Let us call this the geometry ($\bar{g}$) for the U9 problem. Let N be the number of fiducials, and index $i \in 0 \ldots N-1$. Three-dimensional fiducial points ($\bar{p}^i$) represent the model of the constellation. They are related to the given projected fiducial points ($\bar{q}^i$). Estimated projected points ($\bar{e}^i$) are determined from the geometry ($\bar{g}$) where:

$$\bar{e}^i = (e_0^i, e_1^i) \quad (1)$$

$$e_0^i = \bar{v}_0 \cdot \left[ \bar{s} - \bar{d} + (\bar{p}^i - \bar{s}) \frac{\bar{v}_2 \cdot (\bar{d} - \bar{s})}{\bar{v}_2 \cdot (\bar{p}^i - \bar{s})} \right] \quad (2)$$

$$e_1^i = \bar{v}_1 \cdot \left[ \bar{s} - \bar{d} + (\bar{p}^i - \bar{s}) \frac{\bar{v}_2 \cdot (\bar{d} - \bar{s})}{\bar{v}_2 \cdot (\bar{p}^i - \bar{s})} \right] \quad (3)$$

Figure 1:
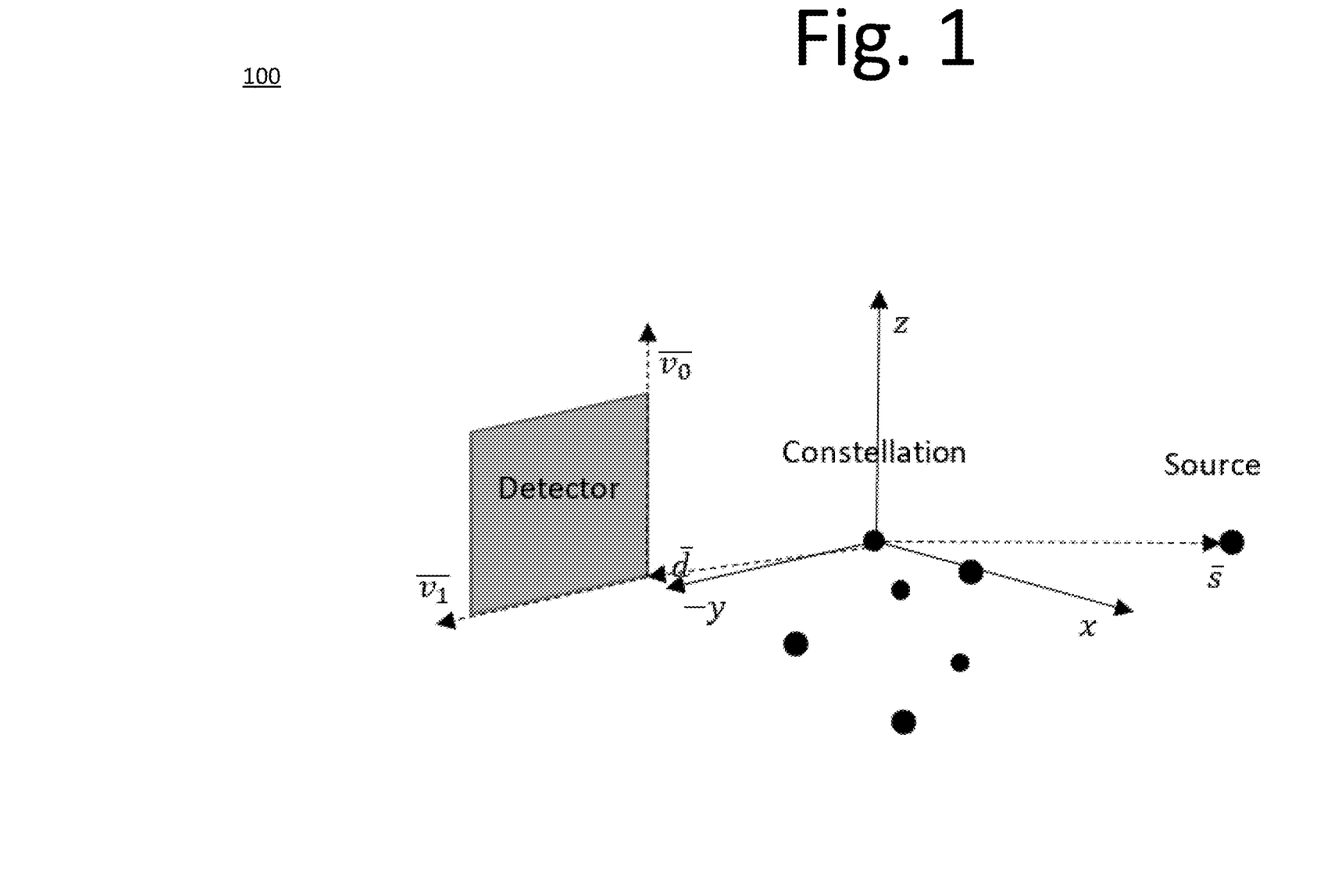
FIG. 1 is a diagram illustrating shot geometry with constellation, according to an embodiment of the present invention.

Analyzing the system, if all the fiducials are unknown, then there is complete ambiguity regarding the coordinate system. To overcome this deficiency, one fiducial is selected as the origin of the coordinate system and the geometry of one x-ray shot is used to establish the orientation of the coordinate system. See FIG. 1, which is a diagram 100 illustrating shot geometry with constellation, according to an embodiment of the present invention.

To study the size of the problem, let there be X shots and N fiducials. The system has 2 known values (that is, knowns) for every fiducial seen in every shot making the total number of knowns $$\text{knowns} = 2NX \quad (4)$$

Given that one fiducial is set as the origin and one shot has rotations set to zero, the total number of unknowns is $$U9 \text{unknowns} = 3(N-1) + 6 + 9(X-1) \quad (5)$$

In one example, for N=6 and X=360, there are 4320 knowns and 3252 unknowns. This problem may be solved, but the high number of unknowns compared to knowns can make optimization techniques stall. Thus, one may seek to reduce the number of unknowns.

Solving for the Simplified Geometry—U7 Problem

In the related application, the concept of the anchor point was introduced, which reduces the number of geometric unknowns for each shot from 9 to 7. This reduction in complexity may be called the U7 problem.

Also, in the related application, a new coordinate system was translated by the anchor and multiple anchors were selected for the known reference constellation. For the unknown reference constellation, there is one point selected as the anchor to be used as the global origin. Consequently, the geometry terms require no translation.

However, the relative distance (a) between the source and the detector along $\overline{v_2}$ may be considered instead of ($d_x$, $d_y$, $d_z$). To show this, let's consider the projection of the anchor point in detector coordinates ($\overline{b}$). See FIG. 2, which is a diagram 200 illustrating a shot geometry with a constellation anchor, according to an embodiment of the present invention.

Figure 2:
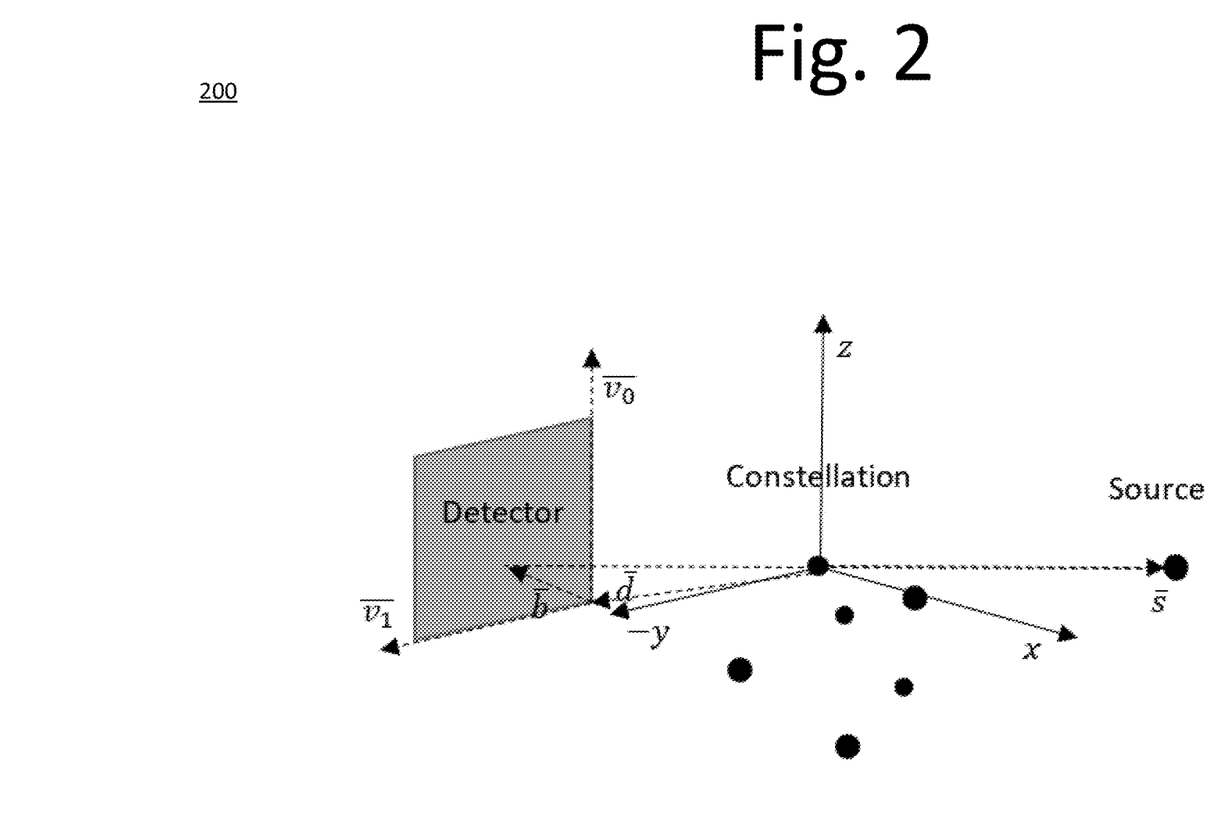
FIG. 2 is a diagram illustrating a shot geometry with a constellation anchor, according to an embodiment of the present invention.

Knowing that $\overline{b}$ is determined by passing through the new origin, Equations (8) and (9) are used to show that $$b_0 = \overline{v_0} \cdot \left[\overline{s}\left(\frac{\overline{v_2} \cdot \overline{d}}{\overline{v_2} \cdot \overline{s}}\right) - \overline{d}\right] \quad (6)$$

$$b_1 = \overline{v_1} \cdot \left[\overline{s}\left(\frac{\overline{v_2} \cdot \overline{d}}{\overline{v_2} \cdot \overline{s}}\right) - \overline{d}\right] \quad (7)$$

where $b_2$ is obviously 0 since $\overline{b}$ lies in the plane of the detector. Let's also consider a new basis using orthogonal unit vectors $\overline{v_0}$, $\overline{v_1}$, and $\overline{v_2}$ such that $$\overline{s} = (s_0, s_1, s_2) \quad (8)$$

$$\overline{d} = (d_0, d_1, d_2) \quad (9)$$

Equations (12) and (13) are now simplified and the following relationships can be derived $$\alpha = \frac{d_2}{s_2} \quad (10)$$

$$b_0 = \alpha s_0 - d_0 \quad (11)$$

$$b_1 = \alpha s_1 - d_1 \quad (12)$$

Consequently, seven unknowns may be used to describe the geometry for each subproblem ($\overline{h}$):

$$\overline{h} = (s_x, s_y, s_z, \alpha, r_x, r_y, r_z), \quad (13)$$

where $\overline{e}^i$ is still determined from Equations (8) and (9) after relating $\overline{h}$ to an equivalent $\overline{g}$ using the relationships above. This has the effect of fixing the projected anchor point and only moving the estimates of the remaining projected constellation points.

$$U7\text{unknowns} = 3(N-1)+4+7(X-1) \quad (14)$$

In this example, for N=6 and X=360, there are same 4320 knowns and now only 2532 unknowns. This is still a large number, but there is a savings of 2× unknowns and the equations/processes significantly reduce the ratios of unknowns to knowns. This can help the convergence of the optimization technique.

Cost Functions

To this point, the cost function that must be reduced by the optimization technique has not been defined. Similar to the related application, a cost function may be defined for $\overline{g}$ or $\overline{h}$ when the fiducials are identified. Using the definition of the 12 norm for some vector $\overline{x}$ as $$|\overline{x}| = \sqrt{\sum_{i=0}^{N-1} x_i^2} \quad (15)$$

then the cost for any shot where fiducials are identified is $$\text{cost\_identified}(\overline{g}) = \left[\sum_{i=0}^{N-1} \left|\overline{e}^i(\overline{g}) - \overline{q}^i\right|^P\right]^{\frac{1}{P}} \quad (16)$$

for some P, where P>1. The total cost would be the sum over all shots. If fiducials are not identified, a different cost function must be used such that every visible projected fiducial point should have a good estimate $$\text{cost\_unidentified}(\overline{g}) = \sum_{k=0}^{N-1}\left[\sum_{i=0}^{N-1}\left|\overline{e}^i(\overline{g}) - \overline{q}^k\right|^{-P}\right]^{\frac{-1}{P}} \quad (17)$$

Fiducials not observed in a shot are excluded from the outer loop of the cost evaluation.

Use Cases

The information provided by the optimization technique may be used in one of two ways.

Use Case 1

If the solution is deemed satisfactory, the resultant shot geometries may be used to reconstruct the volume image. See, for example, FIG. 3, which is a flow diagram illustrating a process 300 for executing a Use Case 1 for satisfactory model and geometry estimates, according to an embodiment of the present invention.

Figure 3:
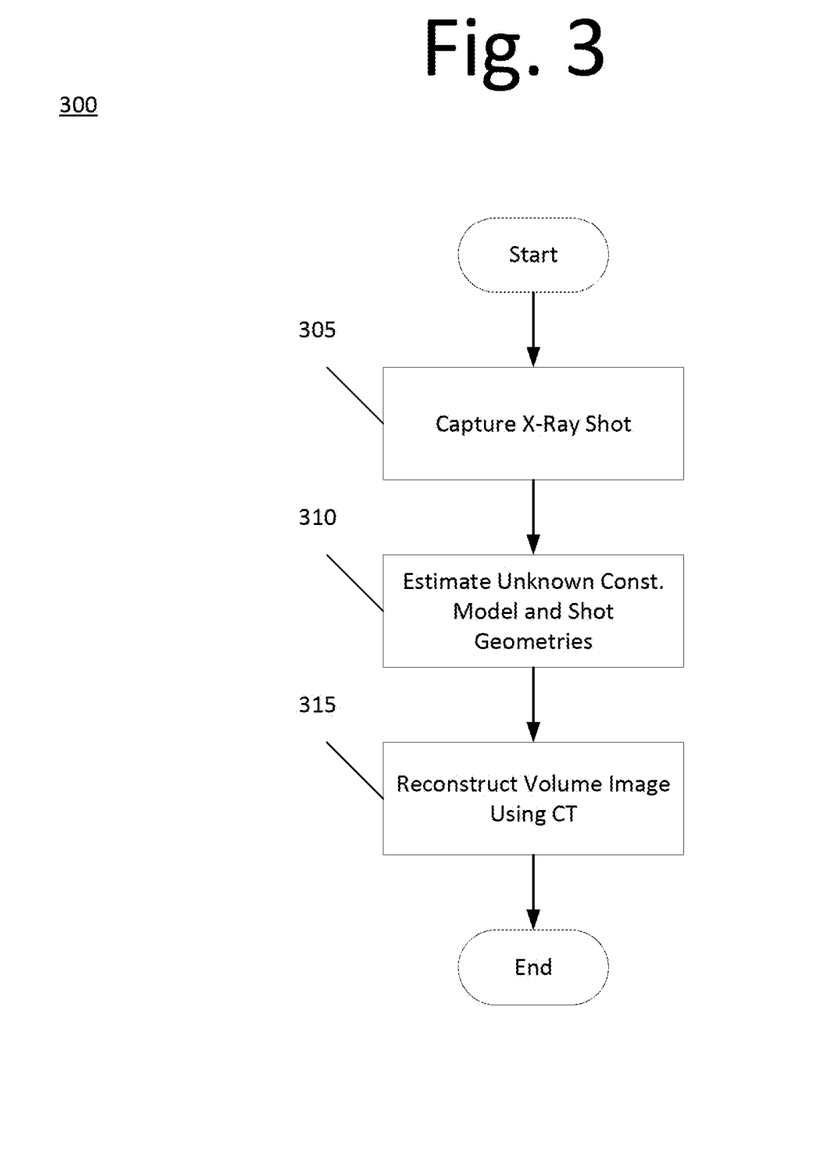
FIG. 3 is a flow diagram illustrating a process for executing a Use Case 1 for satisfactory model and geometry estimates, according to an embodiment of the present invention.

In some embodiments, process 300 includes capturing one or more x-ray shot images (the "x-ray shot images") into a computing system at 305. At 310, process 300 includes estimating unknown constellation model and shot geometries. For a more detailed explanation of step 310. Process 300 further includes reconstructing a volume image from the shot images and geometries at 315.

Use Case 2

Additional processing may be required to re-estimate the shot geometries. For example, the obtained constellation model is used to uniquely and automatically identify all constellation fiducials as they appear in every shot. The shot geometries is then re-estimated using the processes described in the related application for self-determined shot geometry using a known constellation. See, for example, FIG. 4, which is a diagram illustrating a process 400 for Use Case 2 for satisfactory model and re-estimate geometry, according to an embodiment of the present invention.

Figure 4:
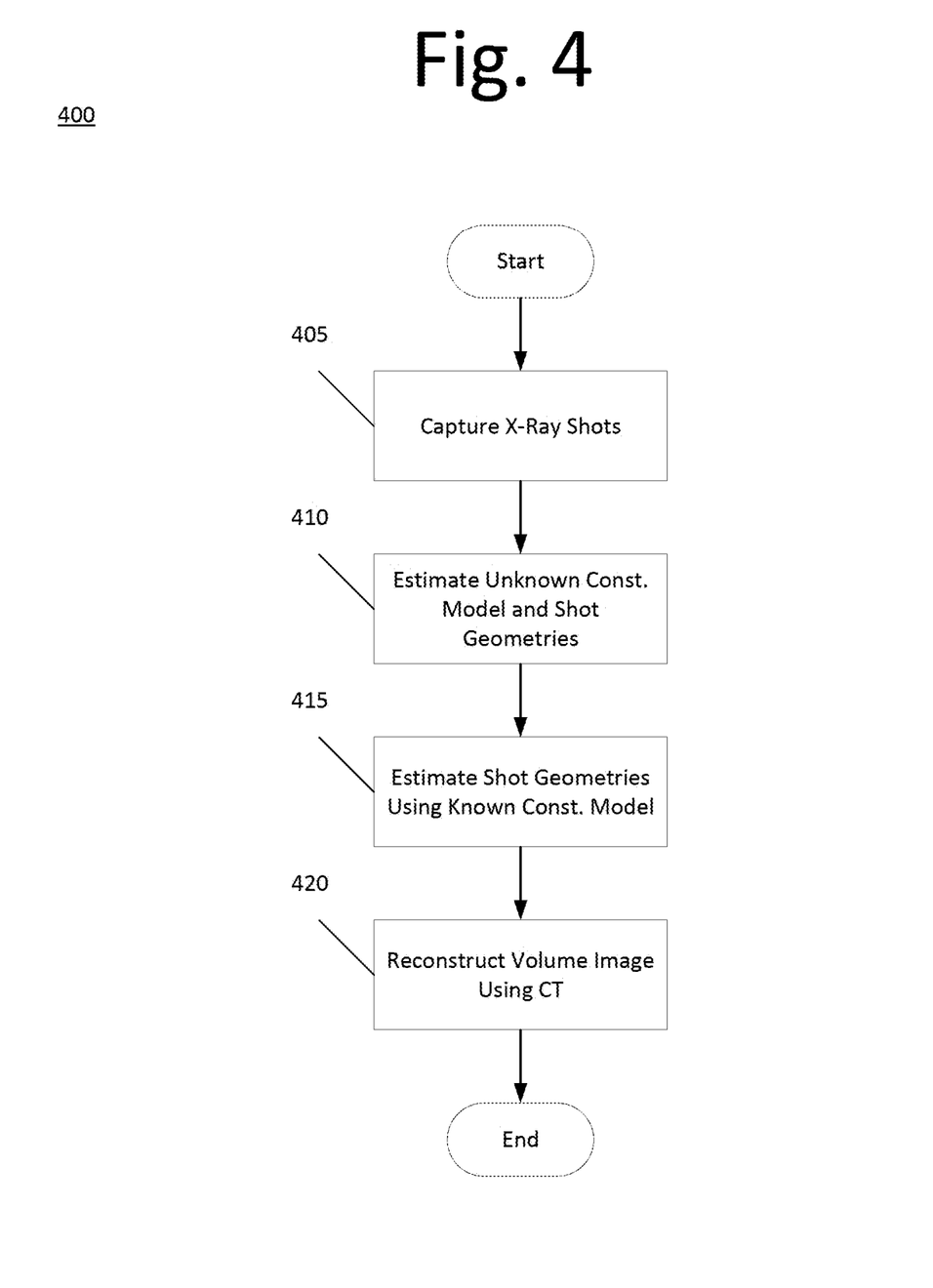
FIG. 4 is a diagram illustrating a process for Use Case 2 for satisfactory model and re-estimate geometry, according to an embodiment of the present invention.

In some embodiments, process 400 includes capturing one or more x-ray shot images (the "x-ray shot images") into a computing system at 405. At 410, process 400 includes estimating unknown constellation model and shot geometries. For a more detailed explanation of step 410. Process 400 further includes estimating shot geometries using known constellation model at 415, as described in FIG. 5 of the related application. Process 400 includes reconstructing a volume image from the shot images and geometries using CT at 420.

Solving for the unknown constellation is difficult since it has so many system unknowns, but the greatest asset of some of the embodiments described herein is a satisfactory estimate of the constellation model.

Supporting Results

Figure 5A:
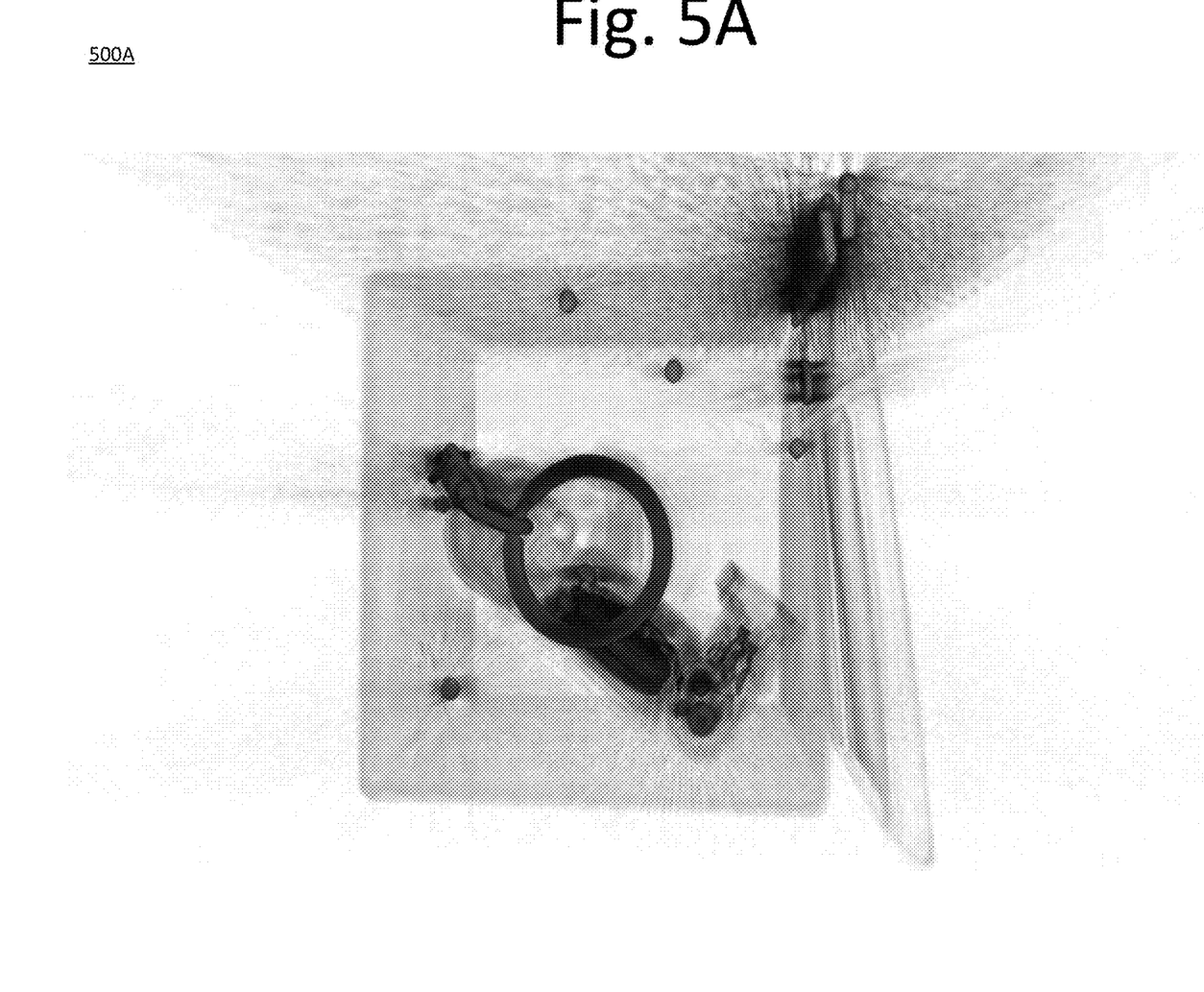
FIGS. 5A and 5B are images illustrating a reconstructed volume by solving for unknown constellation and geometries, according to an embodiment of the present invention.
Figure 5B:
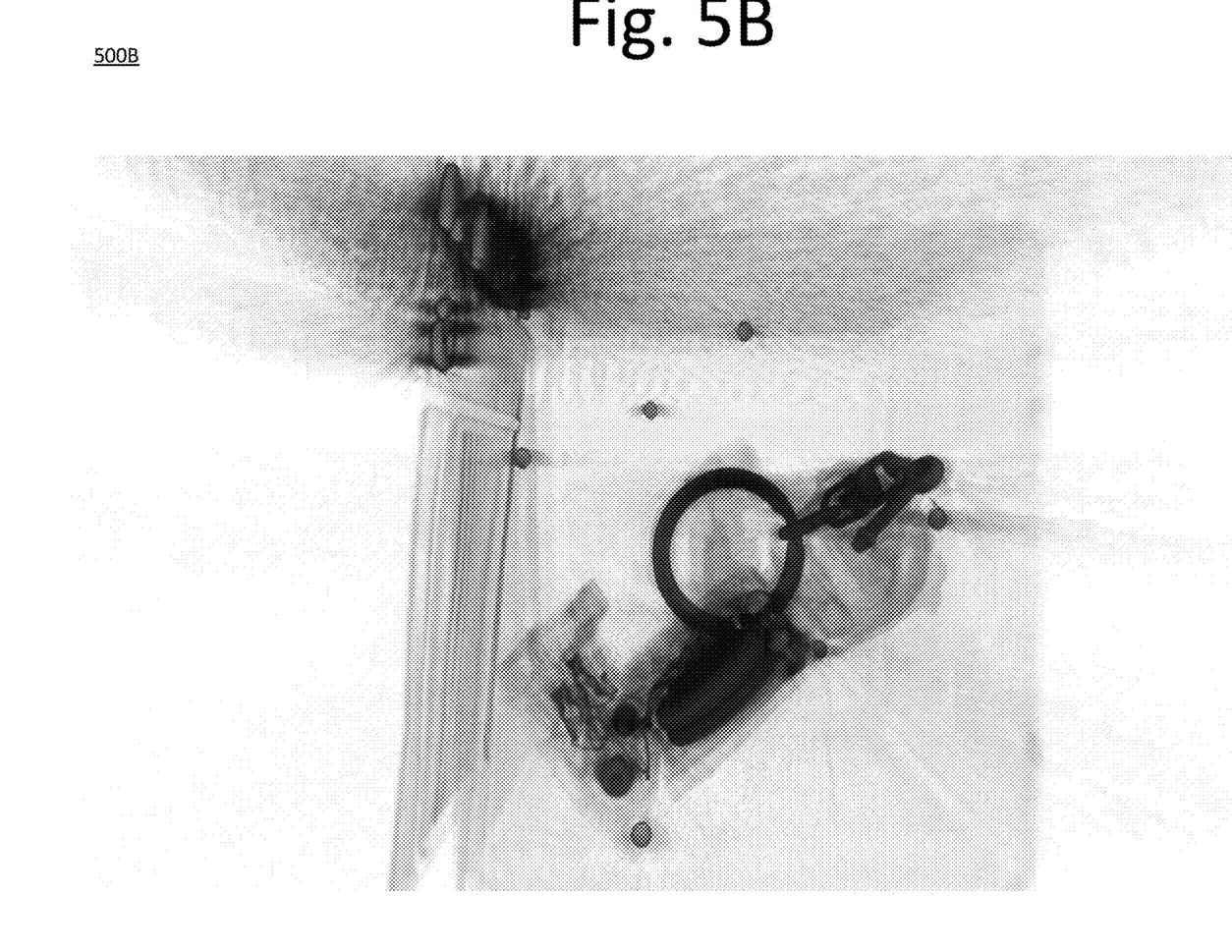

A small toy, image quality indicator (IQI), and a constellation were imaged for the process described above. See, for example, FIGS. 5A and 5B, which are images illustrating a reconstructed volume by solving for unknown constellation and geometries, according to an embodiment of the present invention. Images 500A and 500B represent viewing the volume from the front and back. Imperfections in the estimation of the shot geometries are manifested by image artifacts such as beam hardening, etc.

Figure 6A:
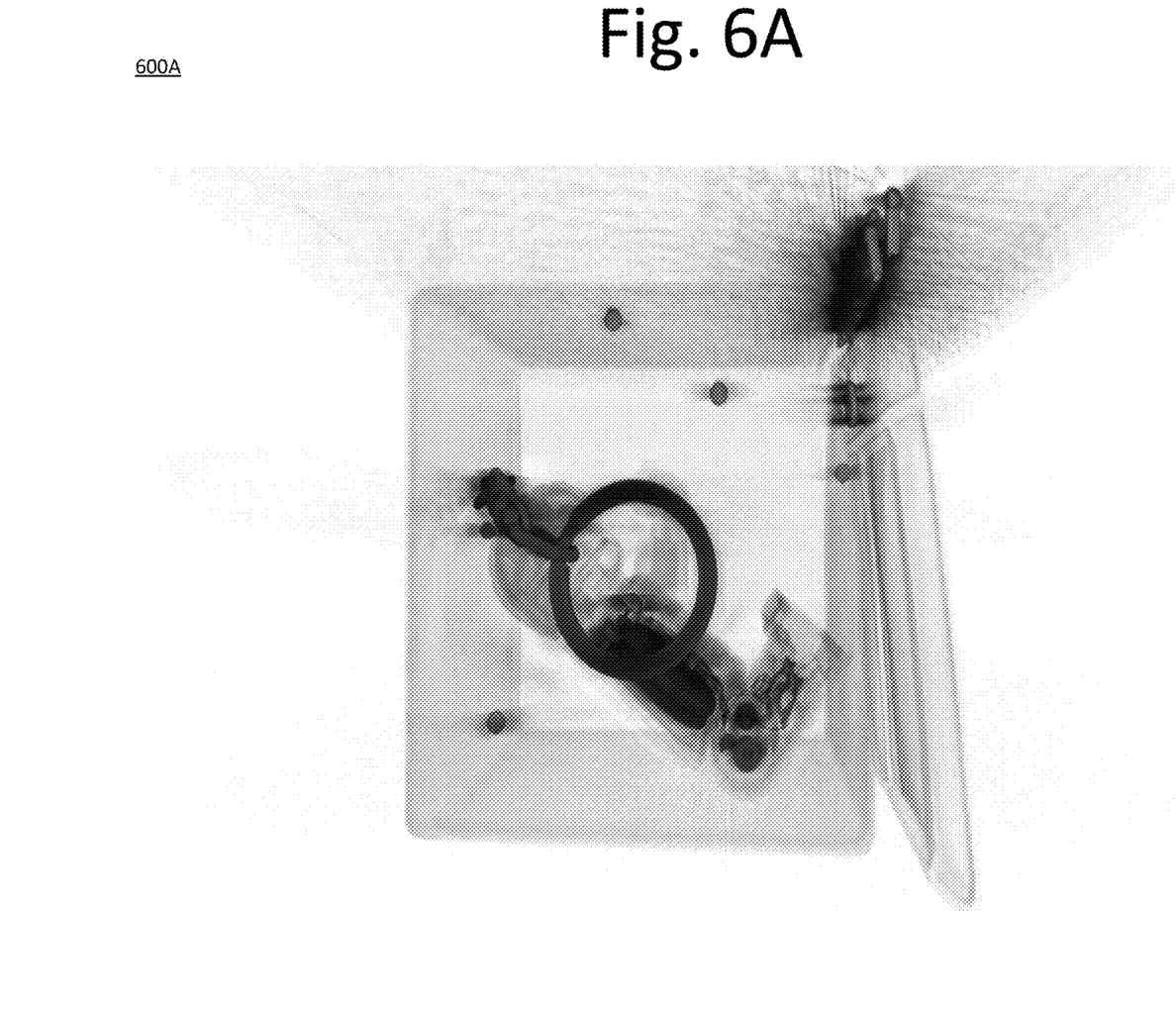
FIGS. 6A and 6B are images illustrating a reconstructed volume by using known constellation and solving for geometries, according to an embodiment of the present invention.
Figure 6B:
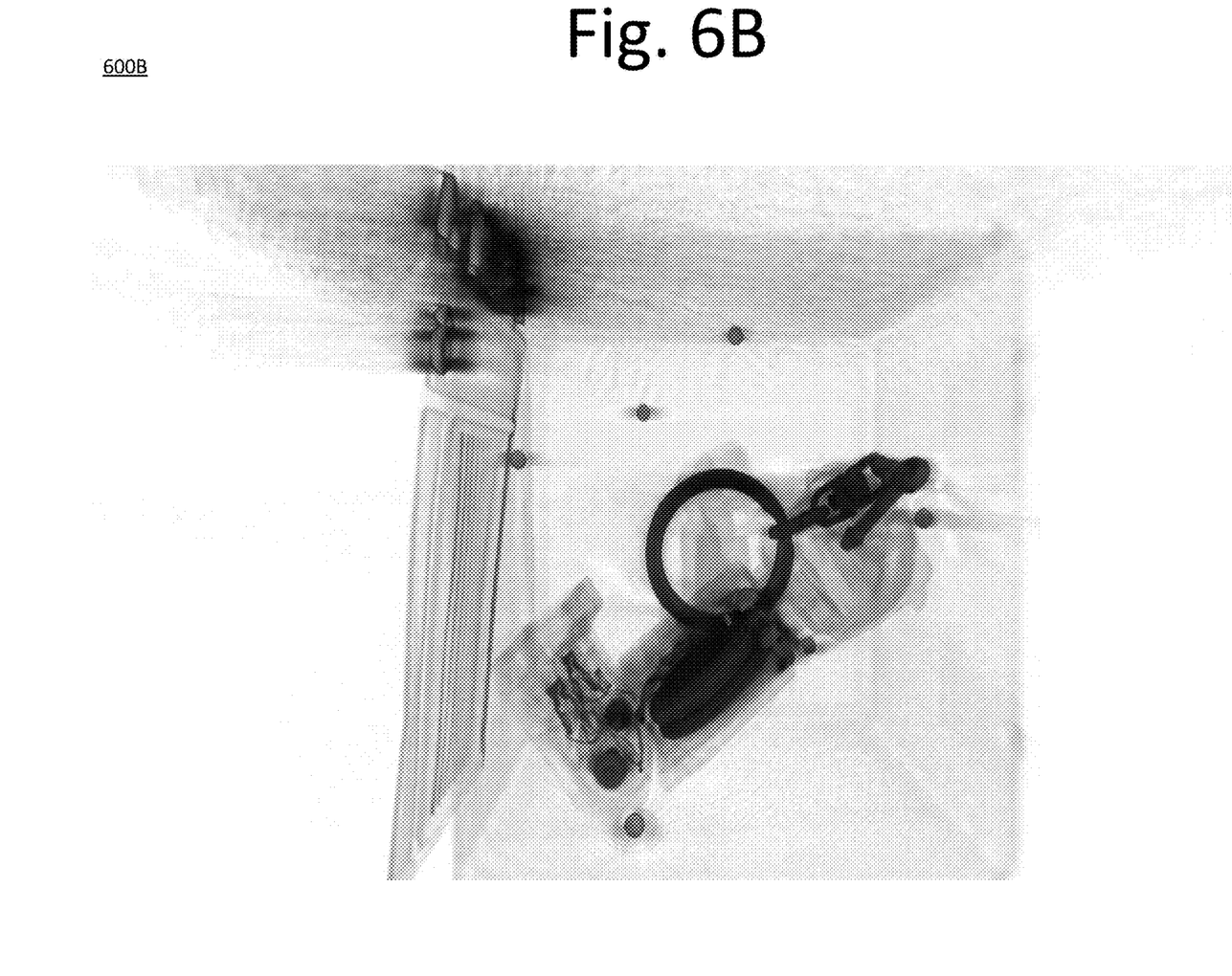

See also FIGS. 6A and 6B, which are images 600A and 600B illustrating a reconstructed volume by using known constellation and solving for geometries, according to an embodiment of the present invention. As shown in images 600A and 600B of FIGS. 6A and 6B, the final shot geometries significantly improve the estimation of shot geometries and reduce the manifestation of image artifacts.

Figure 7:
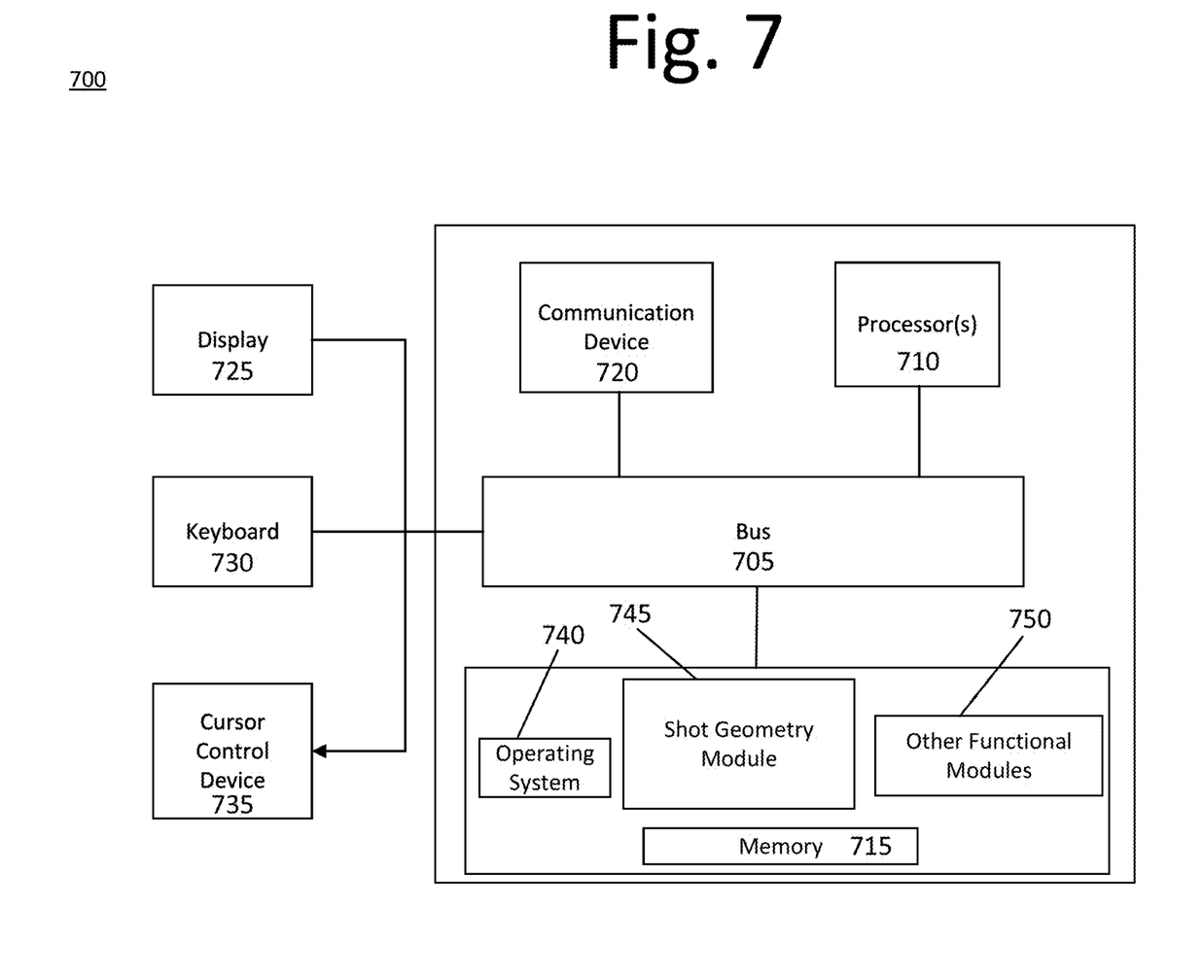
FIG. 7 is an architectural diagram illustrating a computing system configured to perform self-determined shot geometry, according to an embodiment of the present invention.

FIG. 7 is an architectural diagram illustrating a computing system 700 configured to perform self-determined shot geometry, according to an embodiment of the present invention. In some embodiments, computing system 700 may be one or more of the computing systems depicted and/or described herein. Computing system 700 includes a bus 705 or other communication mechanism for communicating information, and processor(s) 710 coupled to bus 705 for processing information. Processor(s) 710 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 710 may also have multiple processing cores, and at least some of the cores may be configured to perform specific functions. Multi-parallel processing may be used in some embodiments. In certain embodiments, at least one of processor(s) 710 may be a neuromorphic circuit that includes processing elements that mimic biological neurons. In some embodiments, neuromorphic circuits may not require the typical components of a Von Neumann computing architecture.

Computing system 700 further includes a memory 715 for storing information and instructions to be executed by processor(s) 710. Memory 715 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 710 and may include volatile media, non-volatile media, or both. The media may also be removable, non-removable, or both.

Additionally, computing system 700 includes a communication device 720, such as a transceiver, to provide access to a communications network via a wireless and/or wired connection. In some embodiments, communication device 720 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 720 may include one or more antennas that are singular, arrayed, phased, switched, beamforming, beam-steering, a combination thereof, and or any other antenna configuration without deviating from the scope of the invention.

Processor(s) 710 are further coupled via bus 705 to a display 725, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 725 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 730 and a cursor control device 735, such as a computer mouse, a touchpad, etc., are further coupled to bus 705 to enable a user to interface with computing system. However, in certain embodiments, a physical keyboard and mouse may not be present, and the user may interact with the device solely through display 725 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 700 may operate autonomously.

Memory 715 stores software modules that provide functionality when executed by processor(s) 710. The modules include an operating system 740 for computing system 700. The modules further include a shot geometry module 745 that is configured to perform all or part of the processes described herein or derivatives thereof. Computing system 700 may include one or more additional functional modules 750 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 3 and 4 may be performed by a computer program, encoding instructions for the processor(s) to perform at least part of the process(es) described in FIGS. 3 and 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 710 of computing system 700 of FIG. 7) to implement all or part of the process steps described in FIGS. 3 and 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    capturing one or more x-ray shot images into a computing system;
    estimating an unknown constellation model and one or more shot geometries with respect to a coordinate system, wherein the coordinate system is defined by an unknown constellation of markers, the unknown constellation of markers are identified from the one or more captured x-ray shot images, the one or more captured x-ray shot images are from a portable or movable x-ray generator or detector; and
    reconstructing a volume image from the one or more captured shot images and the one or more geometries using computed tomography.

2. The computer-implemented method of claim 1, further comprising:
    estimating the one or more shot geometries using a known constellation model.

3. The computer-implemented method of claim 1, further comprising:
identifying one fiducial of a plurality of fiducials as an origin of a coordinate system; and
establishing an orientation of the coordinate system using a geometry of one of the one or more x-ray shots.

4. The computer-implemented method of claim 3, wherein the identifying of the one fiducial is assisted by the one fiducial having a unique feature, wherein the unique feature being size, texture, or shape.

5. The computer-implemented method of claim 3, further comprising:
removing remaining fiducials of the plurality of fiducials from the volume image after reconstruction but prior to performing volume image analysis.

6. The computer-implemented method of claim 1, further comprising:
quantifying the one or more shot geometries by a source position in Cartesian coordinates, a detector position in Cartesian coordinates, and orthogonal detector orientation unit vectors.

7. The computer-implemented method of claim 1, further comprising:
reducing a cost function by using an optimization technique, wherein
the cost function is defined for geometry ($\bar{g}$) and subproblem ($\bar{h}$) when one fiducial is identified.

8. The computer-implemented method of claim 7, further comprising:
using a definition of a 12 norm for some vector $\bar{x}$ as $$|\bar{x}| = \sqrt{\sum_{i=0}^{N-1} x_i^2}$$

the cost for any shot where fiducials are identified is $$\text{cost\_identified}(\bar{g}) = \left[\sum_{i=0}^{N-1} |\bar{e}^i(\bar{g}) - \bar{q}^i|^P\right]^{\frac{1}{P}}$$

where for some P, where P>1.

9. The computer-implemented method of claim 8, further comprising:
when fiducials are not identified, using a different cost function such that every visible projected fiducial point has a good estimate as defined by $$\text{cost\_unidentified}(\bar{g}) = \sum_{k=0}^{N-1} \left[\sum_{i=0}^{N-1} |\bar{e}^i(\bar{g}) - \bar{q}^k|^{-P}\right]^{\frac{-1}{P}}.$$

10. A system, comprising:
at least one processor; and
memory comprising a set of instructions, wherein
the set of instructions is configured to cause the at least one processor to execute:
capturing one or more x-ray shot images into a computing system;
estimating an unknown constellation model and one or more shot geometries with respect to a coordinate system, wherein the coordinate system is defined by an unknown constellation of markers, the unknown constellation of markers are identified from the one or more captured x-ray shot images, the one or more captured x-ray shot images are from a portable or movable x-ray generator or detector; and
reconstructing a volume image from the one or more captured shot images and the one or more geometries using computed tomography.

11. The system of claim 10, wherein the set of instructions is further configured to cause the at least one processor to execute:
estimating the one or more shot geometries using a known constellation model.

12. The system of claim 10, wherein the set of instructions is further configured to cause the at least one processor to execute:
identifying one fiducial of a plurality of fiducials as an origin of a coordinate system; and
establishing an orientation of the coordinate system using a geometry of one of the one or more x-ray shots.

13. The system of claim 12, wherein the identifying of the one fiducial is assisted by the one fiducial having a unique feature, wherein the unique feature being size, texture, or shape.

14. The system of claim 12, wherein the set of instructions is further configured to cause the at least one processor to execute:
removing remaining fiducials of the plurality of fiducials from the volume image after reconstruction but prior to performing volume image analysis.

15. The system of claim 10, wherein the set of instructions is further configured to cause the at least one processor to execute:
quantifying the one or more shot geometries by a source position in Cartesian coordinates, a detector position in Cartesian coordinates, and orthogonal detector orientation unit vectors.

16. The system of claim 10, wherein the set of instructions is further configured to cause the at least one processor to execute:
reducing a cost function by using an optimization technique, wherein
the cost function is defined for geometry ($\bar{g}$) and subproblem ($\bar{h}$) when one fiducial is identified.

17. The system of claim 16, wherein the set of instructions is further configured to cause the at least one processor to execute:
using a definition of a 12 norm for some vector $\bar{x}$ as $$|\bar{x}| = \sqrt{\sum_{i=0}^{N-1} x_i^2}$$

the cost for any shot where fiducials are identified is $$\text{cost\_identified}(\bar{g}) = \left[\sum_{i=0}^{N-1} |\bar{e}^i(\bar{g}) - \bar{q}^i|^P\right]^{\frac{1}{P}}$$

where for some P, where P>1.

18. The system of claim 17, wherein the set of instructions is further configured to cause the at least one processor to execute:
when fiducials are not identified, using a different cost function such that every visible projected fiducial point has a good estimate as defined by $$\text{cost\_unidentified}(g) = \sum_{k=0}^{N-1} \left[ \sum_{i=0}^{N-1} \left| \tilde{e}^i(g) - \tilde{q}^k \right|^{-P} \right]^{\frac{-1}{P}}.$$

19. A non-transitory computer-readable medium comprising a computer program, the computer program is configured to cause at least one processor to execute:

capturing one or more x-ray shot images into a computing system;

estimating an unknown constellation model and one or more shot geometries with respect to a coordinate system, wherein the coordinate system is defined by an unknown constellation of markers, the unknown constellation of markers are identified from the one or more captured x-ray shot images, the one or more captured x-ray shot images are from a portable or movable x-ray generator or detector; and reconstructing a volume image from the one or more captured shot images and the one or more geometries using computed tomography.

* * * * *